United States Patent [19]

Sugier et al.

[11] Patent Number: 5,055,178
[45] Date of Patent: Oct. 8, 1991

[54] PROCESS FOR EXTRACTION OF WATER MIXED WITH A LIQUID FLUID

[75] Inventors: Andre Sugier; Paul Bourgmayer, both of Rueil Malmaison; Alexandre Rojey, Garches, all of France

[73] Assignee: Institut Francais du Petrole, France

[21] Appl. No.: 460,322

[22] PCT Filed: Apr. 20, 1989

[86] PCT No.: PCT/FR89/00185
§ 371 Date: Feb. 16, 1990
§ 102(e) Date: Feb. 16, 1990

[87] PCT Pub. No.: WO89/10392
PCT Pub. Date: Nov. 2, 1989

[30] Foreign Application Priority Data

Apr. 22, 1988 [FR] France .................................. 88 05491

[51] Int. Cl.$^5$ .............................................. C10G 33/04
[52] U.S. Cl. .................................... 208/188; 208/187; 585/15; 585/867
[58] Field of Search ................. 208/187, 188; 585/15, 585/867

[56] References Cited

U.S. PATENT DOCUMENTS 3,124,926  3/1965  Walker et al. .................... 585/15 X
3,126,334  3/1964  Harlow ............................ 585/15 X

FOREIGN PATENT DOCUMENTS 1074144  6/1967  United Kingdom .

Primary Examiner—Curtis R. Davis
Assistant Examiner—William C. Diemler
Attorney, Agent, or Firm—Antonelli, Terry, Stout & Kraus

[57] ABSTRACT

The invention relates to a process for extracting water mixed with a liquid fluid. The process is characterized in particular by carrying out the following steps:

forming a dispersion of hydrates of a gas within the fluid, these hydrates being formed from water and gas in a sufficient quantity, the gas being suitable for forming hydrates;

separating the hydrates from at least most of the fluid, the hydrates possibly being with a remaining part of the fluid, and breaking down the hydrates previously concentrated in order to obtain gas and water.

13 Claims, 1 Drawing Sheet

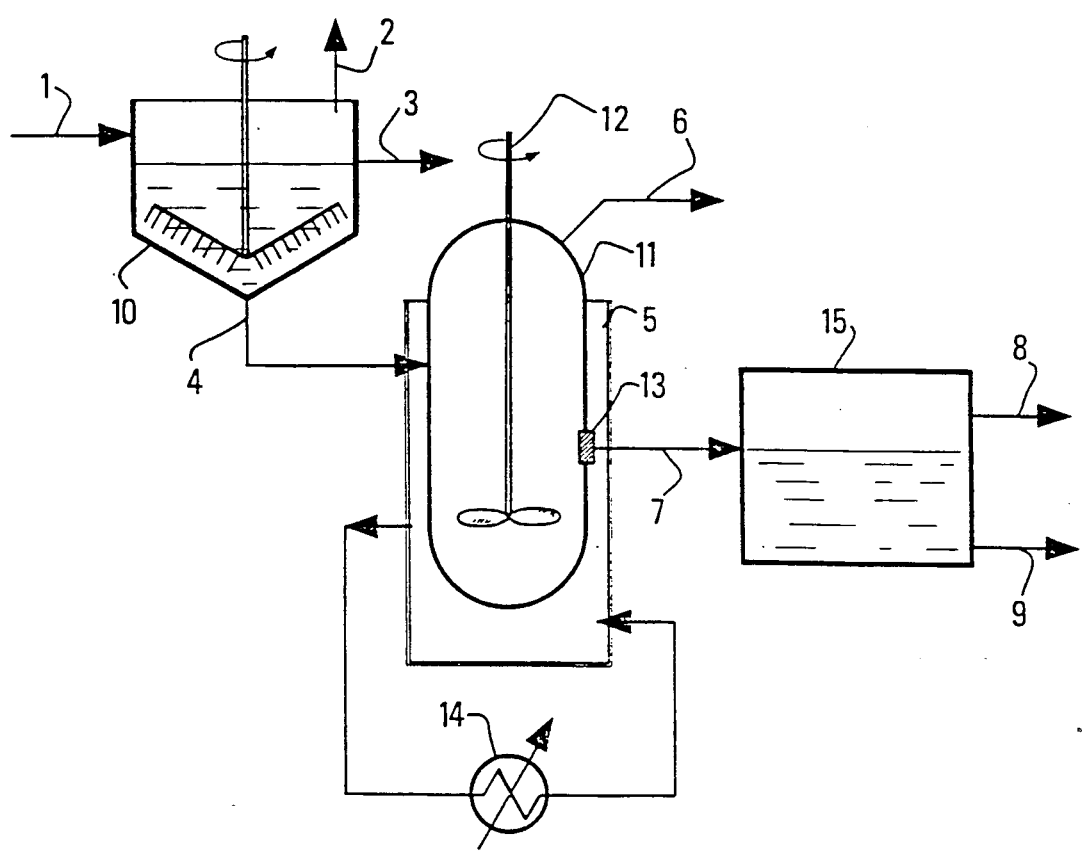

PROCESS FOR EXTRACTION OF WATER MIXED WITH A LIQUID FLUID

The invention relates to a process for extracting the water mixed with a liquid fluid by formation of gas hydrates by means of at least one gas.

This gas which forms hydrates with water may be, for example, methane, ethane, ethylene, propane, propene, n-butane, i-butane, $H_2S$, or $CO_2$ and may come from natural deposits such as deposits of natural hydrocarbon gas, petroleum gas, or other gases.

These hydrates form when the water is in the presence of the gas, whether it is in the free state or in the dissolved state in a liquid fluid such as a liquid hydrocarbon, and when the temperature reached by the mixture, particularly of water, gas, and possibly liquid fluid such as oil or a condensate, becomes lower than the thermodynamic temperature at which the hydrates form, said temperature being determined for a known gas composition and when the gas pressure is fixed. The thermodynamic temperature increases in proportion to the pressure of the gas or gases, so that the higher the pressure, the less the gas and water have to be cooled to form hydrates.

The invention is particularly useful for transporting petroleum and gas products when the conditions required for hydrate formation are reached.

Indeed, natural gas or petroleum produced by a deposit usually contains water which, under certain thermodynamic conditions such as the climatic conditions of the North Sea or winter or polar conditions, reacts with the gas or gases to form hydrates which clog pipes and generate substantial financial losses.

According to the invention, hydrates are formed in the dispersed form, possibly with an additive, in order (easily) to separate the water contained in the hydrate from the liquid fluid with which it is mixed.

Advantageously, this formation of hydrate in the dispersed form may be accomplished before or during transportation of fluids attaining the conditions of hydrate formation.

These conditions obtain naturally when a pipeline is under the sea where the temperature of the water may be 3° or 4° C., for example.

Thus, on the one hand, formation of hydrates which occurs naturally, either completely or only partially, prevents any or some consumption of the hydration energy essential for extraction of the water, in addition to which dispersion of the hydrates prevents them from coalescing and blocking the pipes.

The possibility of forming hydrates that disperse within a liquid was discovered when it was found that certain surfactants which hitherto were not used for this purpose, have an excellent ability to change the mechanism by which hydrates are formed.

Instead of finding that hydrates clump together forming very solid blocks and plugs, or deposits in the systems in which the hydrate-generating fluid flows, it has been observed, over a very broad temperature range, that these surfactants disperse these hydrates in this fluid and thus prevent their clumping.

When a mixture of given gases, fluids, and surfactants is subjected to a temperature significantly lower than the temperature at which hydrates start to form, the fluid thickens without blocks or plugs forming, this thickening increasing with decreasing temperature.

These additives are very advantageous on the one hand because of their effectiveness:
  very low concentration (generally less than 2% or even 0.5% by weight with respect to the water),
  and because of their moderate cost.

The invention provides a process for extracting the water mixed with a liquid fluid that is substantially insoluble in said water, characterized in particular by carrying out the following steps:
forming a dispersion of hydrates of a gas within the fluid, these hydrates being formed from water and gas in a sufficient quantity, the gas being suitable for forming hydrates;
separating the hydrates from at least most of the fluid, the hydrates possibly being with a remaining part of the fluid, and
breaking down the hydrates previously concentrated in order to obtain gas and water.

Before or during the formation of hydrates, an additive suitable for producing hydrates in the dispersed form may be used.

The liquid fluid may include hydrocarbons.

Advantageously, the additive, the water, and said fluid will be able to permit dispersion of the fluid in the water.

The additive may include at least one element of the group of polyol and substituted or non-substituted carboxylic acid esters and the group of hydroxycarbylamides of substituted or non-substituted carboxylic acids.

The hydrates may be formed by lowering the temperature and/or increasing the pressure of the gas and the mixture including the fluid and water.

After the hydrates have broken down, the water from the hydrates and the remaining part of the fluid may be separated from each other.

After the hydrates have been concentrated,
they may be introduced into a dissociation reactor, possibly mixed with said remaining part of the fluid,
the reactor may be heated by means that allow the hydrates to decompose,
the mixture formed by the fluid, the water produced by decomposition of the hydrates, and the hydrates may be agitated,
the gas produced by said decomposition may be removed from the reactor, and
a fraction of the mixture containing no hydrate may be removed from the reactor.

The water and the fluid contained in the hydrate-free fraction of the mixture removed from the reactor may be separated.

At least part of the gas coming from decomposition of the hydrates may be used to heat said reactor.

The process of extracting the water contained in petroleum effluents may be used, said gas being suitable for forming hydrates including a petroleum gas.

Since the effluents are transported under conditions in which hydrates form, an additive able to produce hydrates in the dispersed form may be added to the effluents before or during transportation of these effluents.

The invention will be understood and its advantages will emerge clearly from reading the description hereinbelow of a non-limiting embodiment illustrated by the attached figure which schematically represents a water extraction unit operating with the process according to the invention.

The liquid fluid mixed with the water to be extracted therefrom first receives at least one appropriate additive and one appropriate gas and is subjected to thermodynamic temperature and pressure conditions allowing hydrates to be formed from the gases dispersed in the fluid.

In the embodiment, the liquid fluid is a condensate extracted with water and gas from an offshore petroleum deposit, said gas forming hydrates with water.

A typical proportion of water and condensate by volume is, for example, 5 parts of water to 95 parts of condensate.

The composition by weight of the condensate may be, for molecules having less than 11 carbon atoms, 22% of a mixture of paraffins, isoparaffins, naphthenes, and aromatics. The gas in the deposit contains 98% methane and 2% ethane by volume.

To the mixture from the deposit is added copra diethanolamide at the rate of 0.2% by weight with respect to the water. This mixture is then carried to the bottom of the sea over several tens of kilometers where it reaches the bottom temperature of approximately 3° C. or less because of the Joule-Thomson effect produced by expansion of the methane and its evaporation produced by the lowering of the pressure due to pressure losses in the line. The maximum pressure loss ordinarily allowed is about 1 bar per kilometer. In the example described, the well produces at a pressure of 100 bars at the bottom of the sea. The minimum temperature reached by the mixture is 1° C., associated with the pressure conditions and the presence of a suitable additive, allows formation of hydrates in a dispersed form.

Almost all the water contained in the mixture is found in the hydrates.

The mixture, having reached the level of the surface of the land, is sent to separator 10 which it enters via orifice 1 at a pressure of 50 bars.

Under these conditions, the volume ratio between gas and condensate is 100 m³/m³ and 25 molar % of gas with respect to condensate is dissolved in the latter. The density of the hydrates is 0.91 and that of the condensate, less than 0.8.

This separator 10 separates the gas evacuated by top outlet 2 from the condensate which flows out through middle outlet 3 while the hydrates mixed with the remainder of the condensate are evacuated through bottom outlet 4. The remaining proportions of condensate and hydrates at outlet 4 are ⅓ to ⅔, respectively.

Separator 10 used and represented is a gravity decanting separator having a scraper, but a floatation, centrifugation, or filtration separator or a hydrocyclone, etc. could equally well be used.

The hydrates concentrated and mixed with the condensate coming from bottom outlet 4 are taken to inlet 5 of a dissociation reactor. In this reactor, the pressure of 7 bars and temperature kept constant at +15° C. allow the hydrates to break down. The mixture formed by the condensate, the water produced by breakdown of the hydrates, and the hydrates is agitated by an agitator 12 in order to increase the rate of breakdown.

The gas produced by hydrate breakdown is removed from the reactor via top outlet 6 while a fraction of the mixture including water and the condensate, and hydrate-free, is removed from the reactor via outlet 7. Separating means 13 such as a filter provided with an anti-clogging device prevent the hydrates from using outlet 7. Reactor 11 is heated by heating means comprising, for example, a furnace 14 fed with part of the gas coming from reactor top outlet 6, whereby this furnace heats a heat-carrying fluid in contact with the reactor.

The power required for this furnace 14, which is 140 kW for a mixing flowrate of 50,000 kg/h, may be largely furnished by the gas coming from the reactor (2 MW). Furnace 14 could be replaced by a heat exchanger able to contribute energy.

Outlet 7 through which the water and condensate pass is connected to decanting means such as a tank which allow them to be separated from each other. The supernatant condensate above the water is removed through top outlet 8 while the water is removed via bottom outlet 9.

The pressure in the decanting means is held at 2 bars. The following table shows the materials balance (kg/h) of the material transfers in the extraction unit described above at the various inlets and outlets of the system for a treated fluid flow of 50,000 kg/h.

Since the percentage of hydrate dispersant additive with respect to the water is 0.2 wt. %, the hourly flow of additive is 4.4 kg/h. This additive, which is not recovered in the extraction unit, is largely found with the extracted water and is not introduced into the balance.

The methane listed in the table is both gaseous and liquid and is mixed in the condensate.

| Inlet or Outlet | Materials Balance(kg/h) | | | | | |
| --- | --- | --- | --- | --- | --- | --- |
| | Liquid | Gas | Hydrates | Water | Condensate | Methane |
| 1 | 45,840 | 1,880 | 2,280 | 0 | 43,887 | 3,833 |
| 2 | 0 | 1,880 | 0 | 0 | 0 | 1,880 |
| 3 | 44,701 | 0 | 0 | 0 | 42,797 | 1,904 |
| 4-5 | 1,139 | 0 | 2,280 | 0 | 1,090 | 49 |
| 6 | 0 | 133 | 0 | 0 | 0 | 133 |
| 7 | 3,286 | 0 | 0 | 2,196 | 1,090 | 0 |
| 8 | 1,090 | 0 | 0 | 0 | 1,090 | 0 |
| 9 | 2,196 | 0 | 0 | 2,196 | 0 | 0 |

In the embodiment described above, the hydrates form naturally in a transfer pipe. It will not be a departure from the invention to produce hydrates by any other suitable means such as cooling units and/or units compressing said liquid and/or said gas.

In the same way as the condensate was dehydrated, any type of chemical such as pharmaceuticals that withstand neither low pressures nor elevated temperatures may be dried.

Just as water is extracted from a liquid fluid, water may be separated from a non-hydrate-forming liquid fluid in order to recover the water. The process then allows production of noncontaminated water such as desalinated water.

Without departing from the framework of the invention, for the mixture treated by the process, the quantities of liquid fluid and water may be very different from the case of petroleum production, for example 20 parts by weight of fluid to 100 parts by weight of water, or even 40 parts by weight to 1200 parts by weight of water.

Likewise, the quantity and nature of the additives used will be adapted to the nature and quantity of water and fluid.

Another liquid compound may be added to the liquid fluid and to the water.

We claim:

1. A process for extracting water mixed with a liquid fluid substantially insoluble in said water, characterized by carrying out the following steps:

forming a dispersion of hydrates of a gas within said fluid in the presence of an additive, said hydrates being formed from said water and said gas in a sufficient quantity, said gas being suitable for forming hydrates and said additive being suitable for causing the hydrates to be in a dispersed state;

separating the dispersed hydrates from at least most of the fluid, the hydrates being concentrated possibly with a remaining part of the fluid; and breaking down said concentrated hydrates in order to obtain said gas and said water.

2. A process according to claim 1, characterized by admixing the additive with the fluid either before or during hydrate formation.

3. A process for extracting water mixed with a liquid fluid substantially insoluble in said water, characterized by carrying out the following steps:

forming a dispersion of hydrates of a gas within said fluid in the presence of an additive, said hydrates being formed from said water and said gas in a sufficient quantity, said gas being suitable for forming hydrates and said additive being suitable for causing the hydrates to be in a dispersed state and having at least one element from the group of polyol and substituted or non-substituted carboxylic acid esters and the group of hydroxycarbylamides of substituted or non-substituted carboxylic acids;

separating the dispersed hydrates from at least most of the fluid, the hydrates being concentrated possibly with a remaining part of the fluid; and breaking down said concentrated hydrates in order to obtain said gas and said water.

4. A process according to claim 3, wherein the additive is admixed with the fluid either before or during hydrate formation.

5. A process according to claim 1, claim 2 or claim 3, characterized by forming hydrates by lowering the temperature and/or increasing the pressure of said gas and a mixture including the fluid and said water.

6. A process according to claim 1 or claim 3, characterized in that, after the hydrates have been broken down, said water obtained from the hydrates and said remaining part of the fluid are separated from each other.

7. A process according to claim 1 or claim 3, characterized by the following steps, after the hydrates have been concentrated:

the hydrates in a dispersed state are introduced into a dissociation reactor possibly mixed with said remaining part of the fluid;

the reactor is heated to allow the hydrates to break down;

a mixture formed by the fluid, the water produced by the break down of hydrates, and the hydrates is agitated;

the gas produced by the break down of the hydrates is removed from the reactor; and a hydrate-free fraction of the mixture is removed from the reactor.

8. A process according to claim 7, characterized by separating the water and the fluid contained in said fraction of the hydrate-free mixture removed from the reactor.

9. A process according to claim 8, characterized by using at least part of the gases coming from the break down of the hydrates to heat said reactor.

10. A process according to claim 1 or claim 3, characterized by said liquid fluid including a hydrocarbon.

11. A process according to claim 1 or claim 3, wherein said fluid comprises petroleum effluents and said gas suitable for forming hydrates contains a petroleum gas.

12. A process according to claim 11, wherein said petroleum effluents are transported under conditions wherein the hydrates form and further characterized by adding to the hydrocarbon effluents, the additive before or during transport of said hydrocarbon effluents.

13. A process according to claim 1, wherein the fluid comprises salt water and the hydrates are extracted in the production of desalinated water.

* * * * *